Nov. 8, 1932.    H. K. SHOCKEY    1,886,503
MACHINE FOR RECLAIMING WORN BRAKE DRUMS
Filed Aug. 5, 1930
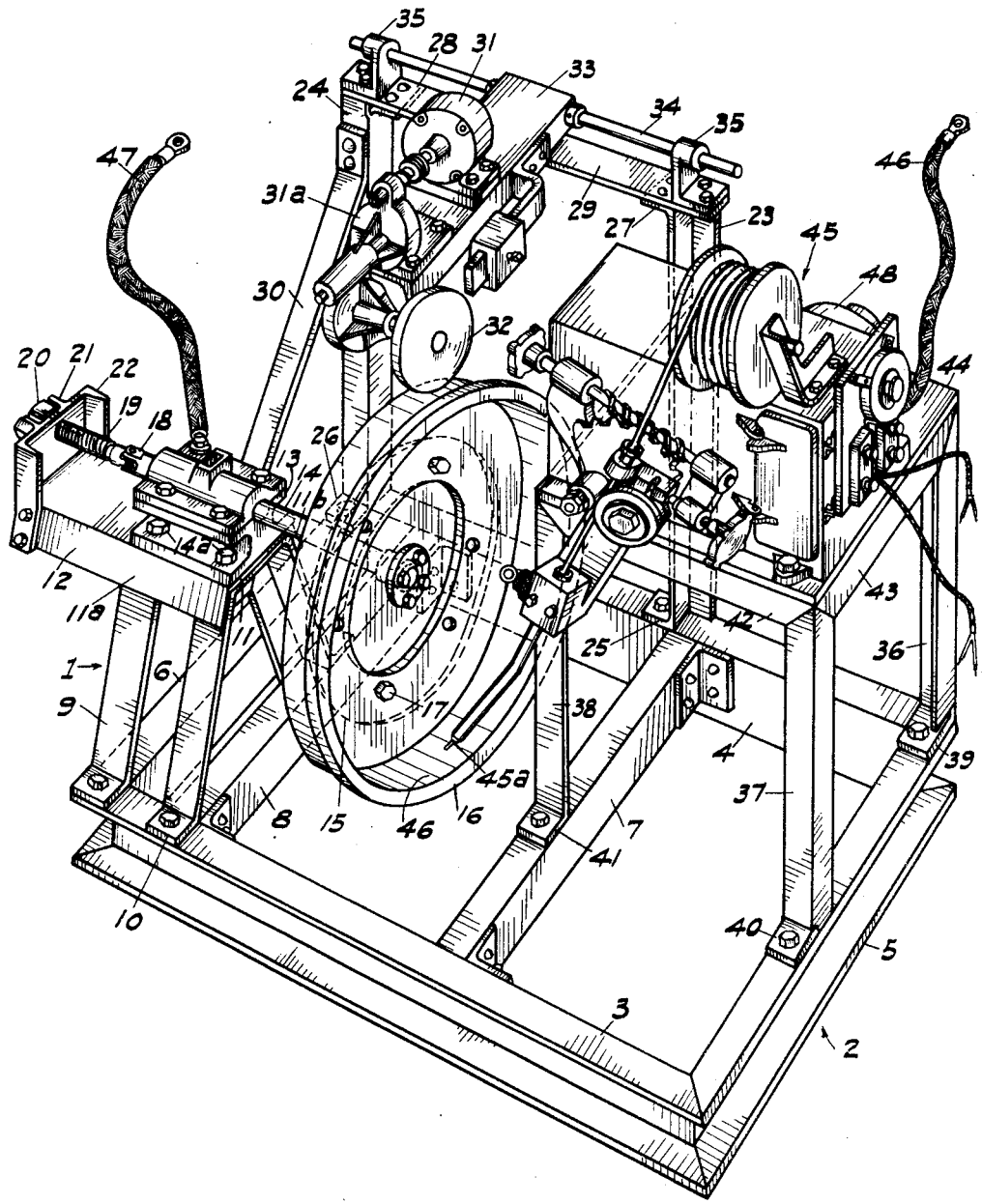
INVENTOR.
HARRY K. SHOCKEY
ATTORNEY Patented Nov. 8, 1932

1,886,503

UNITED STATES PATENT OFFICE

HARRY K. SHOCKEY, OF SAN DIEGO, CALIFORNIA

MACHINE FOR RECLAIMING WORN BRAKE DRUMS

Application filed August 5, 1930. Serial No. 473,198.

This invention relates to means and method for reclaiming worn brake drums by the electric arc welding process.

An important object of the invention is to provide apparatus of the character indicated whereby a layer or layers of molten metal may be deposited and made a homogeneous part of the original drum.

A further important object of the invention is to provide improved means whereby a layer of metal may be deposited in a spirally continuous fashion from beginning to end, thereby eliminating any pithy or pin hole conditions at junctures of welds.

A still further important object of the invention is to provide means wherein a worn brake drum may be built up into a structure which will wear longer than the original drum by making a deposit thereon which will have a much higher resistance to abrasive wear than the parent metal.

A still further object of the invention is, the provision of a method whereby brake drums can be reclaimed at approximately one-half the cost of any other known method now in general use, and very often when it would be impossible to reclaim them by any other means.

A still further object of the invention is to provide means whereby a brake drum may be reclaimed in a manner which will eliminate liners or set in bushings that often come loose, causing a dangerous condition by rendering the brakes useless.

A still further object of the invention is to provide a machine which is adapted for depositing a high resisting abrasive wearing material and amalgamating it to the heavier material of the parent metal drum, thus advancing the art of manufacturing brake drums by making them cheaper and lighter and increasing their longevity as well.

Still other and ancillary objects of the invention will hereinafter appear.

In the accompanying drawing which illustrates the invention:

The figure is a perspective view of a machine embodying the invention.

Referring to the drawing, the apparatus comprises in general a platform, a framework attached to the platform whereon is mounted the work to be reclaimed, a driving mechanism for operating the work during the reclaiming thereof, in combination with means for automatically maintaining a constant arc length and a constant arc voltage in metallic electrode welding by striking the arc automatically and feeding the wire continuously to the work, the latter being a device that is well-known in the art.

Essentially the structure comprises a framework, consisting of a platform base 2 constructed of side channels 3 and 4, and channels 5 and 6, and intermediate channels 7 and 8, said channels being rigidly bound to one another, either by bolting, riveting, or welding, as preferred.

To the end channel 6 and intermediate channel 8 is fastened a pair of angle supports 9 and 10, held in spaced relation by a channel 11, a portion 12 of which overhangs therefrom in cantilever fashion.

The flanges 11a and 11b of the channel 11 are out-turned and take the profile of a flange of each of the angles 9 and 10, said flanges and angles being welded to each other throughout their point of contact.

Upon the back side of the web of the channel 11 is mounted a bearing block 13, the fastening elements 14a of which extend thru the bearing block, base, the channel web and the flanges of the angles.

The bearing 13 is designed sufficiently strong to support the load to which it will be subjected. Journalled in the bearing block 13 is a shaft 14, and on to one end thereof is fastened a face plate 15 to which the brake drum 16 is bolted by means of the bolts 17.

The other end of shaft 14 is provided with a universal joint 18, to which is joined an interchangeable lead screw 19 and nut 20, which produces a horizontal travel of the drum 16, as it is rotated.

The nut 20 is floatatably supported in a housing 21, said housing being carried by an upstanding channel member 22 which is bolted to the extremity of the cantilever beam 12. The lead screw is made interchangeable to accommodate the reclaiming of different sized drums and the universal joint permits of a quick interchange of parts.

The number of threads per inch on the lead screw are designed to suit the size of the welding rod, the welding head and the inches per minute of weld.

The framing supporting the driving mechanism consists of two upright angle supports 23 and 24, each flanged at their top and bottom. The base flange 25 of the upright 23 is fastened to the top flange of the side channel 4 and the base flange 26 of the upright 24 is fastened to the top flange of the end channel 6. To the respective top flanges 27 and 28 of the angle uprights 23 and 24 is fastened a transverse tie plate 29, and a brace 30 is fastened to the upright 24, and the end channel 6 to add stiffness and rigidity to this portion of the framework.

The driving mechanism consists of an electric motor 31, which drives a case hardened driving wheel 32 thru a reduction gear closed in a housing 31a.

This unit is mounted with the center of the driving wheel approximately fourteen inches vertically above the center of the main shaft 14, and positioned horizontally so that it will engage with the outer periphereal surface of the brake drum 16.

The driving unit is secured to the end of adjustably weighted channel iron section 33, the opposite end of said channel 33 being affixed to a shaft 34 which is parallel with the main shaft and whose center of oscillation is substantially at the same height as that of the driving wheel 32.

The shaft 34 is journalled in bearings 35 disposed near its outer ends, said bearings being fastened to the overhanging end portions of the transverse plate 29. The shaft 34 is free to rotate and is also provided with sufficient length so as to move horizontally in the bearings 35. This construction permits the driving wheel 32 to be adjusted vertically to compensate for any diameter of drum, and to move or be moved in a horizontal direction with the drum or in relation to the drum when necessary.

A suitable base is provided to support the welding unit and comprises in part three upstanding angle irons 36, 37 and 38. These are each provided with a base flange, the base flanges 39 and 40 of the upstanding angle irons 36 and 37 being fastened to the top flange of the end channel 5 and the base flange 41 of the upstanding angle iron 38 being fastened to the top flange of the intermediate channel 7. These upstanding angle irons are mitered with transverse angle irons 42 and 43 which form a table support for the table top 44 to which the welding unit 45 is bolted.

There are angle supports (not shown) complementary to 42 and 43 which aid in supporting the table top 44, and the corner of the table top that is diagonally disposed to the post 37 is welded within the angle of the angle upright 23, said angle upright being a dual supporting member.

The welding unit 45 may be any standard automatic or semiautomatic electric welding head. The welding current is supplied through wires 46 and 47, and the electric motor 48 of the welding unit is synchronized with the electric motor 31 of the driving mechanism.

As the drum 16 is rotated, the automatic welder 45 deposits a single layer or bead of molten metal of predetermined size and composition upon the wearing surface 46 of the drum by the positive or negative electrode 45a. This bead is continuous and is applied in a spiral manner. The selection of which kind of electrode is to be used is usually determined by the thickness of the drum's braking surface. The speed of rotation is adjusted to balance with welding conditions. As the drum rotates it is drawn away from the weld by the lead screw 19. The number of turns per inch of cross feed allows each bead as it is being deposited to overlap the preceding bead approximately one-third.

This operation is continued until the entire surface has been covered with a deposit of new metal which is thoroughly fused to the drum, which is then ready to be machined to size and again put in service.

I claim:

1. In a device of the kind described, a frame, a substantially horizontal shaft journalled on said frame, means to secure a brake drum concentrically to an end of said shaft, to rotate therewith in a substantially vertical plane, screw threaded means operatively connected with said shaft to move it longitudinally when rotated, a driving wheel, means to support said driving wheel in driving contact with the exterior surface of the periphery of the drum secured to said shaft as aforesaid, means to rotate said driving wheel, said driving wheel being adapted to advance transversely with regard to the periphery of the brake drum being operated upon, to accommodate axial movement of said drum caused by the screw threaded means aforesaid, and a relatively stationary auxiliary head having a delivery opening positioned to deposit a stream of molten metal upon the inner periphery of the brake drum being operated upon.

2. In a device of the kind described, a frame, a substantially horizontal shaft journalled on said frame, means to secure a brake drum concentrically to one end of said shaft to rotate therewith in a substantially vertical plane, screw threaded means operatively connected with said shaft to move it longitudinally when rotated, a driving wheel, means to support said driving wheel in driving contact with the exterior surface of the periphery of the drum secured to said shaft as aforesaid, means to rotate said driving wheel, said driving wheel being adapted to advance transversely with regard to the periphery of the brake drum being operated upon, to accommodate axial movement of said drum caused by the screw threaded means aforesaid, and a relatively stationary auxiliary head having a delivery opening positioned to deposit a stream of molten metal upon the inner periphery of the brake drum being operated upon, the pitch of the threads of said screw threaded means being such as to cause the welding material to be deposited upon the brake drum in an overlapping spiral manner.

3. In a device of the kind described, a frame, a substantially horizontal shaft journalled on said frame, means to secure a brake drum concentrically to an end of said shaft, to rotate therewith in a substantially vertical plane, screw threaded means operatively connected with said shaft to move it longitudinally when rotated, a second shaft, means to support said second shaft substantially horizontal and at a higher level than the first recited shaft, a vertically oscillative carriage connected with said second shaft, a drive wheel rotatably supported by said carriage in a position to rest upon the exterior upper portion of a brake drum to rotate such brake drum when the latter is secured to the first recited shaft as aforesaid, means to rotate said driving wheel and a relatively stationary welding head having a delivery opening positioned to deposit a stream of molten metal upon the inner periphery of the brake drum being operated upon.

4. In a device of the class described, the combination with means to rotatably support a brake drum, of means to supply a stream of molten metal to the inner periphery of said drum during the rotation thereof, a support, a carriage mounted upon said support to oscillate in a vertical plane, a driving wheel mounted upon said carriage in a position to be brought into contact with and rest upon the outer surface of the periphery of the brake drum being operated upon, said carriage being shiftable axially of the brake drum as well as tiltable with relation to said drum, and means to rotate said driving wheel and thereby rotate said brake drum while the molten metal is being applied thereto.

HARRY K. SHOCKEY.